(12) United States Patent
Kaiser

(10) Patent No.: US 7,260,740 B2
(45) Date of Patent: Aug. 21, 2007

(54) FAULT-TOLERANT COMPUTER CLUSTER AND A METHOD FOR OPERATING A CLUSTER OF THIS TYPE

(75) Inventor: Oliver Kaiser, Wörth (DE)

(73) Assignee: Siemens Aktiengesellshcaft, Munich (DE)

( * ) Notice: Subject to any disclaimer, the term of this patent is extended or adjusted under 35 U.S.C. 154(b) by 471 days.

(21) Appl. No.: 10/469,874

(22) PCT Filed: Feb. 28, 2002

(86) PCT No.: PCT/EP02/02181

§ 371 (c)(1),
(2), (4) Date: Sep. 5, 2003

(87) PCT Pub. No.: WO02/071223

PCT Pub. Date: Sep. 12, 2002

(65) Prior Publication Data

US 2004/0158770 A1     Aug. 12, 2004

(30) Foreign Application Priority Data

Mar. 7, 2001     (EP)  ................................ 01105702

(51) Int. Cl.
  *G06F 11/00* (2006.01)
  *G06F 11/14* (2006.01)
(52) U.S. Cl. .............................. 714/12; 714/11; 714/10
(58) Field of Classification Search .................... 714/9, 714/12; 712/40
  See application file for complete search history.

(56) References Cited

U.S. PATENT DOCUMENTS

| | | | | |
|---|---|---|---|---|
| 4,937,741 A | * | 6/1990 | Harper et al. | ................ 713/375 |
| 4,979,108 A | * | 12/1990 | Crabbe, Jr. | .................. 718/106 |
| 5,276,823 A | * | 1/1994 | Cutts et al. | .................... 714/11 |
| 5,339,404 A | * | 8/1994 | Vandling, III | ................... 714/1 |
| 5,754,789 A | * | 5/1998 | Nowatzyk et al. | ........... 709/233 |

(Continued)

FOREIGN PATENT DOCUMENTS

| | | |
|---|---|---|
| DE | 19814096 | 10/1999 |
| EP | 0611171 | 8/1994 |
| EP | 0942363 | 9/1999 |
| WO | WO9844416 | 10/1998 |

OTHER PUBLICATIONS

Heterogeneous Processing: Concepts and Systems by Ekmecic, Tartalja and Milutinovic http://galeb.etf.bg.ac.yu/~vm/tutlaorial/multi/hetero/parallel.htm version from Jun. 26, 1997, found via the Way Back Machine.*

*Primary Examiner*—Gabriel L. Chu
*Assistant Examiner*—Joseph Schell
(74) *Attorney, Agent, or Firm*—Harness, Dickey & Pierce

(57) ABSTRACT

A computer cluster includes a network plane and a processing plane. In the cluster, the network plane is formed by at least one network computer, which is configured to assign a time tag to incoming request data. The processing plane is composed of at least two processing computers, which are supplied in parallel with the request data from the network plane. Each processing computer is configured to process the request data in a subsequent processing step, if the current value of the time tag falls within a respective significant value range. An "implicit synchronisation" of the computers is thus achieved in a simple manner.

30 Claims, 3 Drawing Sheets

U.S. PATENT DOCUMENTS

| | | |
|---|---|---|
| 5,790,397 A | 8/1998 | Bissett et al. |
| 5,838,849 A * | 11/1998 | Shirasaki .................... 385/31 |
| 5,896,523 A | 4/1999 | Bissett et al. |
| 6,279,119 B1 * | 8/2001 | Bissett et al. .................. 714/12 |
| 6,523,138 B1 * | 2/2003 | Natsume et al. .............. 714/43 |
| 7,124,319 B2 * | 10/2006 | Watkins et al. ................ 714/12 |

* cited by examiner

FAULT-TOLERANT COMPUTER CLUSTER AND A METHOD FOR OPERATING A CLUSTER OF THIS TYPE

This application is the national phase under 35 U.S.C. § 371 of PCT International Application No. PCT/EP02/02181 which has an International filing date of Feb. 28, 2002, which designated the United States of America and which claims priority on European Patent Application number EP 01105702.3 filed Mar. 7, 2001, the entire contents of which are hereby incorporated herein by reference.

FIELD OF THE INVENTION

The invention generally relates to a computer arrangement or computer cluster, which includes a plurality of computers which are interlinked in terms of hardware and/or software such that the functionality of the computer arrangement is outwardly unimpaired, or is impaired only insignificantly, by the failure of one of more of the computers (fault-tolerant computer arrangement). The invention also generally relates to a method for operating such an arrangement.

BACKGROUND OF THE INVENTION

Modern companies have already implemented a large number of services, communication links, monitoring tasks etc. using digital computers today. By way of example, the ordering of goods over the internet is beating down the, until recently, customary mail ordering more and more.

Such an order process involves the customer using his Internet-connected computer to dial up a server in the providing company in order to use the order software available there for his order. During the order process, the customer does not notice how many different computers are simultaneously or successively handling his order process; as long as a fault does not occur during the order process, the customer sees the order situation as though he were communicating with just one computer as his "contact".

If a step in the order process fails, however, then the customer frequently notices this because he needs to reenter information which has already been entered, since information is lost as a result of a fault in any one of the computers in the order system. Such order systems which can be used over the internet are known and are used every day by millions of users.

A drawback of such systems is that, even though they normally include a plurality of computers, failure of one or these computers results in failure of the entire computer system or at least in a loss of a subfunction. Thus, it results in the loss of information and processing time. The reason for this drawback is that the use of such computer arrangements (clusters) essentially achieves the object of distributing demands based on the computer system over a plurality of computers (distribution of load), in order to increase the speed and the number of simultaneously processed operations. On account of the fact that such arrangements involve the demands to be processed not being routed to a plurality of computers simultaneously on account of the desired distribution of load, and the computers in this arrangement not being synchronized, failure of one computer in the arrangement inevitably results at least in a loss of a subfunction and/or in the loss of information.

A computer arrangement containing a plurality of servers is specified in EP 0 942 363 A2, for example. In this case, incoming request data are divided into service classes which are then each processed by a particular number of servers. If a particular service now cannot be processed because the currently available computer capacity resources are not adequate, then servers are detached from other service classes which still have computer resources available and are allocated to the requested service.

The European laid-open specification thus describes a computer cluster in which the request data have their load distributed over the servers. Thus, if there is a resource bottleneck for a service, a server from another service which still has free computation capacity engages.

One drawback in this context is that no solution is provided for the fault scenario. Thus, although failure of a service does not entail the loss of the service in question overall, there is no assurance that the request data transferred to the computer cluster will be maintained in the fault scenario and will be able to be processed further with as few interruptions as possible.

Such computer arrangements are therefore not suitable for critical applications in which no data loss and/or no processing delay must occur in order to avoid any risk to humans and the environment. It is therefore not possible to use such arrangements as, by way of example, a monitoring system in nuclear power plants, as a protection system for dangerous, for example electrical or chemical processes, or as a control system for time-critical procedures.

DE 198 14 096 A1 describes a method for changing over redundantly connected assemblies of the same type. Of these assemblies of the same type, one acts as a master assembly which serves an automation process. A second assembly of the same type is in the "slave mode" (reserve), in order to be able to adopt the function of the master assembly in the event of a fault therein.

Those assemblies of the same type are synchronously provided with the same request data by a superordinate device. In the event of a fault in the master assembly, the assembly in slave mode is activated directly, bypassing the superordinate device, in order to adopt the functionality of the master assembly. This ensures that a faulty assembly is rapidly changed over to an operational assembly in the event of a fault.

However, it is not possible to identify how, in the event of a fault, it is possible to ensure that no request data are lost and that the assembly adopting the function in the event of a fault delivers correct output data.

Another drawback with this method from the prior art is that the assemblies need to be of the same type. This prevents the use of different assemblies having the same function to solve the problem, which results in high costs when implementing such a redundant arrangement. By way of example, it would be possible to have the main computer (master) in the form of a very powerful computer and to have the reserve computer (slave) as a somewhat less powerful computer. Normally, the powerful computer would perform a function of the computer arrangement, and slight losses in computation power would arise only in the event of a fault (when the reserve computer adopts the functionality); such a computer arrangement, which is more cost-effective as compared with the cited prior art, cannot be operated in a fault-tolerant manner with the method described, however.

WO 98/44416 describes a fault-tolerant computer system. This includes, by way of example, four or more CPUs which operate in clock synchronism. Incoming data are processed in clock synchronism by all the CPUs simultaneously. The CPUs transmit their computation results to an evaluation unit which ascertains the validity of these results and outputs a valid result.

In this system, the fault tolerance is implemented virtually exclusively in hardware. Thus, the units (CPUs) which are entirely similar to one another process the same input data absolutely simultaneously (clock synchronously) and deliver an associated result. Failure of one unit thus does not result in failure of the entire system.

A drawback in this context is that such clock synchronously operating solutions are very costly, since clock synchronous operation makes great demands on the hardware used, which additionally needs to be of entirely the same type throughout; tolerances are virtually not permissible in this context. In addition, synchronizing the units used is very complex, since the parallel-connected units can never run one clock cycle apart when processing the request data. In addition, it is not possible to use hardware of a different type throughout in order to implement the redundancy based on this prior art.

Other examples from the prior art for such redundant systems implementing the redundancy exclusively in hardware are the "H systems" (high availability systems) in the SIMATIC automation family from Siemens (e.g. S5-155H; S7-400H). In this case, two respective entirely identical, special central processing units are used which each process the same request data clock synchronously in parallel. The synchronization and monitoring for failure of the central processing units are very complex; in addition, the procurement costs are very high.

SUMMARY OF THE INVENTION

An embodiment of the invention is therefore based on an object of specifying a fault-tolerant computer arrangement which overcomes at least one of the drawbacks described, and can be assembled flexibly even from different components and is cost-effective to manufacture.

An embodiment of the invention achieves an object via a fault-tolerant computer arrangement having a switching level (network plane) and a processing level (processing plane), in which
- the switching level is formed by at least one switching computer which is suitable for allocating incoming request data a time marking,
- the processing level is formed by at least two processing computers which are supplied with the request data in parallel by the switching level, and
- the processing computers are each suitable for processing the request data in a subsequent processing step if the current value of the time marking falls within a respective significant value range.

In such an inventive arrangement, the request data which the arrangement needs to process to arrive at a result are sent to the computer or computers on the switching level (broker).

In this context, the switching level provides the incoming request data with a time marking. This can be, by way of example, the current time signal from a clock assembly or a serial number which contains the time at which the request data arrive at the switching level.

The request data are preprocessed, if appropriate, by the switching level and are transmitted together with the associated time marking in parallel to the processing computers on the processing level. If the processing level includes a plurality of processing sublevels which are respectively formed from at least two computers and specialize in processing a respective particular request type, then the request data are transmitted. They are translated on the basis of their type, from the switching level to the relevant computers on the competent processing sublevel.

A fundamental task of the switching level is thus to provide request data which the inventive computer arrangement needs to process to produce a result with an arrival time stamp and to forward them to the computers on the processing level, which then process the request data to produce a result.

Fault tolerance by the inventive arrangement with regard to failure of one of the processing computers is achieved by virtue of the request data being forwarded not just to one computer on the processing level, as in the case of many solutions in the prior art ("cluster solutions"), but rather to all the computers on the processing level. This ensures that the request data on the processing level are not lost when a computer on this level fails.

The processing computers then each use the current value of the time marking with which the request data are provided to ascertain whether or not these data are processed by the respective processing computer in a subsequent processing step. This prevents the nonsynchronized parallel transfer of information to the processing level from resulting in the processing computers ascertaining different responses as results of the request data. The processing computers evaluate the current value of the time marking by establishing whether the current value of the time marking falls within a respective significant value range.

The computers on the processing level process the request data typically from a plurality of processing steps which can be cyclically successive. Thus, by way of example, every 100 ms a new processing step is completed. In line with an embodiment of the invention, the processing computers process, in one particular processing cycle, only those data whose current value of the time marking falls within a respective significant value range. The latter can include, by way of example, those times which are earlier than the starting time of the next processing cycle less a maximum delay time which is needed at the outside to transfer the data from the switching level to computers on the processing level.

This ensures that the computers on the processing level process the request data synchronously at least at the times at which their processing steps start. This also prevents the processing computers from processing the request data independently of one another, that is to say asynchronously, on account of a time delay during transmission from the switching level, and thus from calculating different results for the request data.

This described manner of inventive synchronization is referred to as "implicit synchronization". This does not require the individual computers to operate in absolute clock synchronism with one another. Instead, a crucial factor in this context is that the processing computers are synchronized only to the extent that they each process only those request data which can still be transmitted safely for the transmission time from the switching level to all of the computers on the processing level up to the starting time of the next processing step.

If, by way of example, a check by the processing computers reveals that the request data have been obtained too late on the switching level in respect of the starting time of the next processing step (this can be established by evaluating the time marking)—that is to say the request data cannot be safely transmitted to all the computers on the processing layer at the start of the next processing step—then the request data are not processed by the processing computers until in the latter's next processing step but one.

This ensures the redundancy of the inventive arrangement to the extent that all the computers on the processing layer process the request data, and failure of one of these computers does not entail a loss of the data or the results.

In one advantageous refinement of the invention, an interface between the inventive computer arrangement and the outside world is formed by the switching level, which accepts incoming request data from the outside world and transmits an associated calculated result to the outside world.

A user coming from outside with a request to the computer arrangement and wanting to obtain a result thus sees the computer arrangement as a single computer. Both the input data and the output data are transferred from just one interface.

In another advantageous refinement of the invention, the switching level is suitable for assessing the results calculated by the processing computers for the request data on the basis of a prescribed validity wall, for selecting one result from the results on the basis of this assessment and for transmitting it to the outside world.

In the case of the inventive computer arrangement, request data are processed by a plurality of processing computers for reasons of redundancy. As the result of the request data, just one of these results is now intended to be transmitted to the outside world, however; the user is meant to obtain a clear result and not to have to select one result from sometimes different results. Using a prescribed validity rule, the switching level therefore assesses which of the results is transmitted to the outside world.

One validity rule can be, by way of example, that the switching level compares the results ascertained by the processing computers of the request data with one another and establishes how many of these results match. If the number of matching results is greater than the number of non-matching results, then one of the results from a group of matching results is transmitted to the outside world as a valid result.

The validity rule can be tightened further by transmitting, by way of example, a valid result to the outside world only if all of the results from the processing computers match. This gives the greatest certainty that the result is correct.

Advantageously, the switching level is formed by at least two switching computers. Each of these switching computers is suitable for detecting a malfunction in at least one other switching computer and for adopting the function thereof. This provides redundancy in the inventive computer arrangement for the function of the switching level as well. If one of the computers on the switching level fails, at least one other computer on the switching level recognizes this. It then adopts the function of the faulty switching computer and processes the incoming request data.

The fault recognition in the switching level can be implemented, by way of example, by virtue of the switching computers interchanging cyclic signals (heartbeat, watchdog) with one another which are checked for continual presence. If such a signal for one of the computers on the switching level does not arise for at least one clock cycle, for example, then the computer in question is identified as being faulty and its function is adopted by another computer on the switching level. The switching computers are advantageously connected by way of a communication bus to which the request data are transmitted. In this way, each of the computers on the switching level has access to the request data. Thus, in the event of a fault in one of the computers, another computer can intervene.

In another advantageous refinement of the invention, the processing level is split into at least two processing sublevels which are each formed by at least two computers and are intended for processing a respective particular request. In the case of this advantageous refinement of the invention, each processing sublevel specializes in processing a respective particular type of request data. Since each processing sublevel is formed from at least two respective computers, a fault in one of these computers does not result in loss of the function in question.

The formation of processing sublevels ensures that the request data's load is distributed over the processing computers. Thus, good use is made of the available computer power. Advantageously, each processing sublevel has at least one of the switching computers associated with it as its request switching computer.

In this advantageous refinement of the invention, the load distribution within the arrangement is improved further because the switching computers are also used for specific tasks. If each task (type of request data) is now provided with at least two computers as request switching computers, then redundancy is also implemented in the switching level for each task.

An embodiment of the invention also results in a method for operating a fault-tolerant computer arrangement having a switching level and a processing level, which has the following steps:
1. incoming request data are read in by at least one switching computer on the switching level and are provided with a time marking.
2. the request data provided with the time marking are forwarded in parallel by the switching computer to the at least two processing computers on the processing level, and
3. the request data are processed by the processing computers in a respective subsequent processing step if the current value of the time marking falls within a respective significant value range.

In one advantageous refinement of the invention, results which are calculated by the processing computers in step 3. These are associated with the request data are assessed by the switching computer on the basis of a prescribed validity rule, and one of these results is selected on the basis of this assessment.

In another advantageous refinement of the invention, the request data are read in, in parallel, by at least two switching computers.

BRIEF DESCRIPTION OF THE DRAWINGS

The text below gives a more detailed illustration of three exemplary embodiments of the invention, where.

DETAILED DESCRIPTION OF THE PREFERRED EMBODIMENTS

Figure 1:
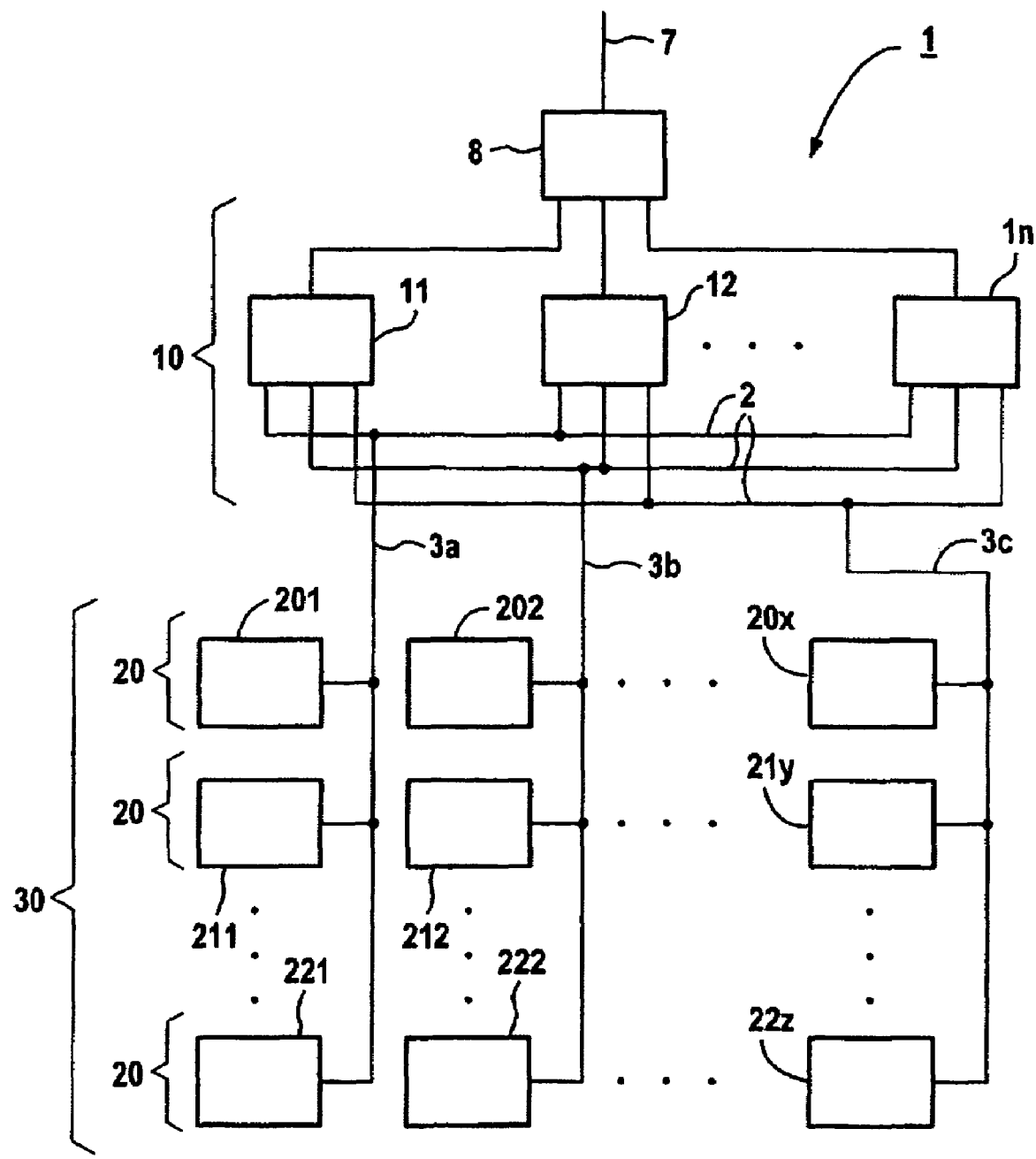
FIG. 1 shows an inventive computer arrangement having a plurality of switching computers and also a processing level divided into a plurality of processing sublevels.

FIG. 1 shows a computer arrangement 1 having a switching level (network plane) 10 and a processing level (processing plane) 30. The switching level 10 contains switching computers 11, 12, 1n to which request data 7 are sent by a switching module 8. In this case, all the computers on the switching level receive the same request data in parallel.

The switching computers 11, 12, 1n are connected to one another by communication links 2. A respective one of these communication links 2 has at least one respective processing computer on each processing sublevel 20 connected to it by way of a communication links 3a, 3b, 3c.

Each processing sublevel 20, which is formed by a plurality of processing computers 201, 202, 20x, 211, 212, 21y, 221, 222, 22z, is used for processing a respective particular type of request data 7. Thus, each processing sublevel 20 specializes, in this respect, in processing a particular task.

The type of embodiment of the communication links 2, 3a, 3b, 3c prevents failure of any one of these communication links 2, 3 from resulting in a loss of data and/or in a loss of a function provided by a processing sublevel 20. If the communication link 3a fails, for example, then the processing sublevels 20 can be provided with request data by way of the communication link 3b.

In addition, the failure of any one of the computers on the switching or processing level also does not result in a loss of information and/or function, since these have each been implemented a plurality of times.

Each task processed in one of the processing sublevels 20 is processed there by a plurality of processing computers. As such, failure of one of these computers does not result in loss of the function of the respective processing sublevel 20.

In addition, failure of one of the switching computers 11, 12, 1n does not result in loss of the function of the switching level 10, since the request data 7 are transferred by way of the switching module 8 to all the computers on the switching level, and each of the switching computers 11, 12, 1n has data access to all the processing computers on the processing level 30 on account of the special design of the communication links 2, 3a, 3b, 3c. The loss of the function of one of the switching computers on the switching level 10 is thus neutralized by the adoption of the latter's function by another switching computer.

In the switching level 10 and in each processing sublevels 20 of the processing level 30. It is therefore respectively possible for all the computers except for one in each case to fail and/or to operate incorrectly without the overall function of the inventive computer arrangement 1 suffering.

The computers on each processing sublevel 20 process the request data obtained, which are provided with a time marking (tag,) in a subsequent processing step if the value of the time marking falls within a significant value range. If this is not the case, then they first return the processing to the next processing step but one. In this case, the processing steps can succeed one another cylindrically (processing cycles as a special case of work steps).

Advantageously, the processing steps on the processing computers each start at the same time. Thus, although the processing computers are not clock synchronized, they are synchronized at least in terms of the common start of their processing steps (this is covered by the term "implicit synchronization").

The computers 11, 12, . . . 1n on the switching level 10 can likewise be implicitly synchronized with one another in a similar manner to the described implicit synchronization of the processing computers.

Figure 2:
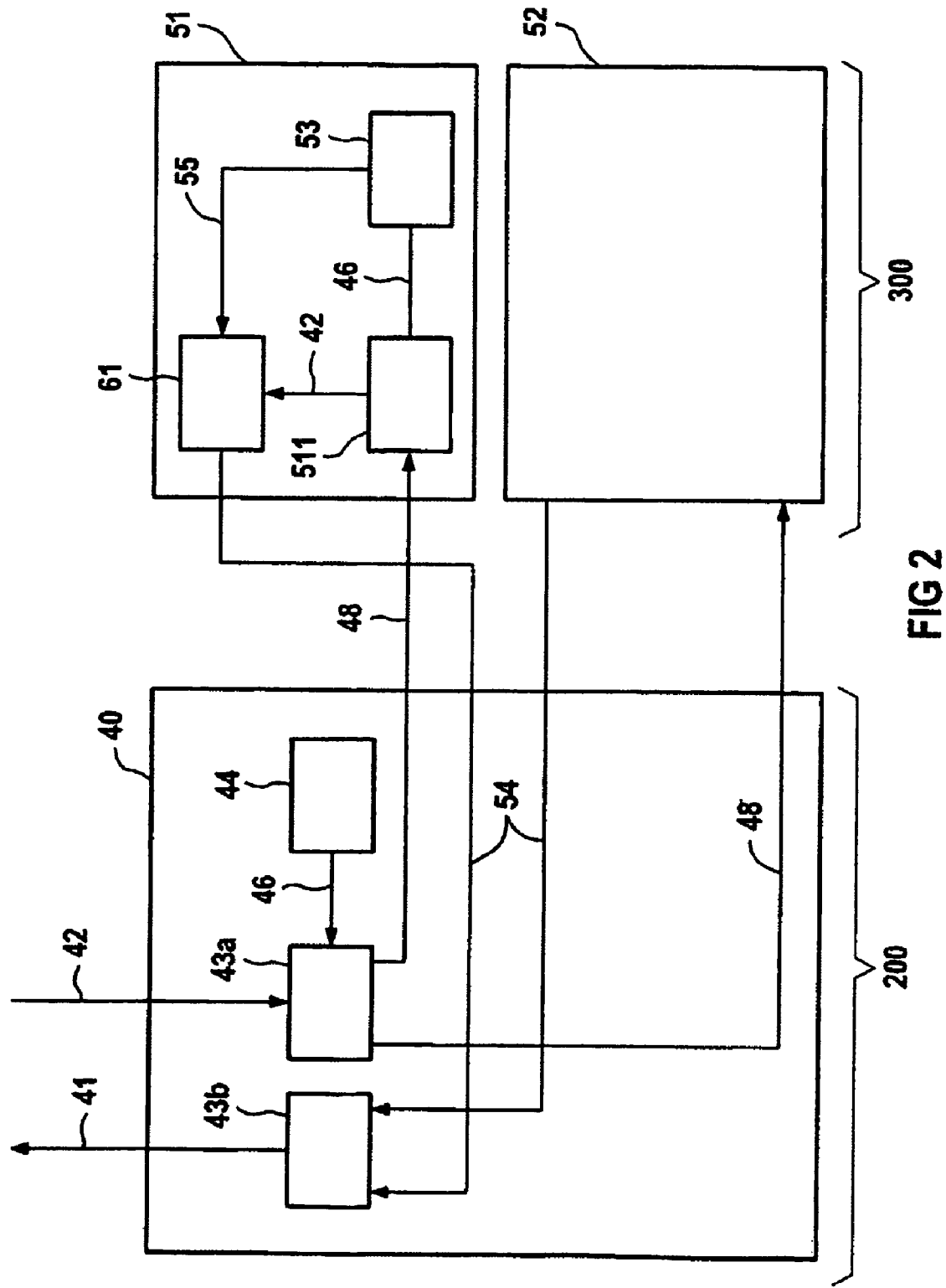
FIG. 2 shows an inventive computer arrangement having a switching computer and two processing computers, with the implicit synchronization being shown in more detail.

FIG. 2 shows an inventive computer arrangement having a switching level 200, which is formed by a switching computer 40, and a processing level 300, which contains two processing computers 51, 52.

Request data 42 are read into an input module 43a. A time signal generator 44 transmits a time marking 46 to the input module 43a. In the input module 43a, the request data 42 are provided with a time marking 46 and are sent in parallel as time-marked request data 48 to the two processing computers 51, 52. In the processing computers 51, 52, a processing chip 511 separates the time marking 46 from the request data 42 and transfers the request data 42 to an application program module 61.

The separated time marking 46 is transmitted from the processing chip 511 to a processing module 53. In this processing module 53, the time marking 46 is checked to determine whether its value falls within a significant value range. This can be the case, by way of example, if the request data 42 have been obtained in the switching level 200 early enough for them to be obtained on all of the processing computers following transmission to the processing computers 51, 52 by the switching levels 200—for which purpose no more than a maximum transmission delay time is required—before a subsequent processing step on the processing computers starts. The respective times for the start of the respective next processing step in each of the processing computers are advantageously the same for all of the processing computers in this case.

This achieves "implicit synchronization". Further, it thus prevents the processing computers 51, 52 from "breaking away from one another", that is to say processing different data at the time at which the processing steps start, and thus delivering different results.

If the current value of the time marking 46 falls within a significant value range—for example as cited above—then the processing module 53 sends a control signal 55 to the application program module 61, so that the latter processes the request data 42 and sends resultant result data 54 to an output module 43b in the switching computer 40. If, during evaluation of the time marking 46, the processing module 53 now establishes that the current value of the time marking does not fall within a significant value range, that is to say, by way of example, the request data could not safely be transmitted to all of the processing computers at the start of the next processing step on the processing computers, then the processing module 53 does not generate a control signal 55 until the next processing cycle but one, so that the application program module 61 does not process the request data 42 until in the next processing cycle but one. This applies to all the processing computers 51, 52 involved, so that they are synchronized in this respect.

The processing computers 51, 52 transmit the result data 54 they calculate to the output module 43b in the switching computer 40. In the output module 43b, the result data 54 are then assessed and a result 41 is output for this.

The assessment in the output module 43b can evolve, by way of example, comparison of the result data 54 delivered by the processing computers 51, 52. If the two results are the same, then the output module 43b outputs any one of these results as the result 41.

If the two results now do not match, then the result 41 can include a fault report, for example. If one of the processing computers 51, 52 cannot deliver any result data 54 at all in the event of a fault, then the output module 43b selects the result data 54 from the operational processing computer as the result 41.

Figure 3:
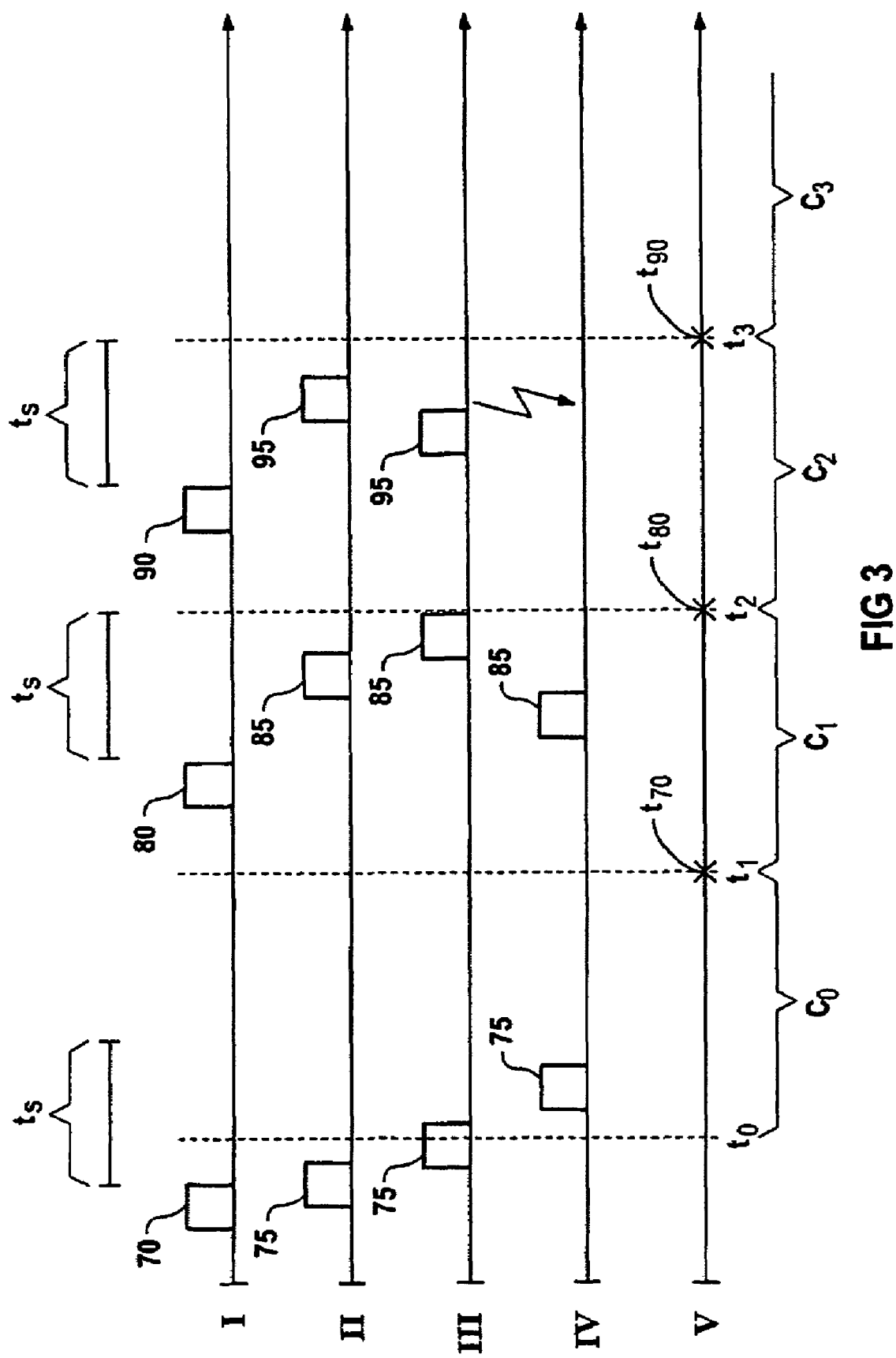
FIG. 3 shows timing diagrams to illustrate the timing of request data which are transmitted from the switching level to the processing level.

FIG. 3 shows the time line I illustrating the timing of the appearance of request data 70, 80, 90, which the switching level provides with a respective time marking on the basis of the time at which the data appear and which are transmitted to all of the processing computers on the processing level. The request data 70, 80, 90 appear at particular intervals of time from one another in the switching level.

The time lines II, III, IV, V are associated with the computers on the processing level. The time lines II, III, IV show the times at which the request data 70, 80, 90 arrive to three processing computers as request data 75, 85 and 95, provided with a time marking.

The time line V illustrates the processing time $t_{70}$, $t_{80}$, $t_{90}$ at which the original request data 70, 80 and 90, respectively, are then processed by the processing computers. The times $t_0$, $t_1$, $t_2$, $t_3$ are starting times for processing steps $C_0$, $C_1$, $C_2$, $C_3$ on the processing computers. The processing steps can follow one another cyclically. By way of example, 100 ms is a typical magnitude for the length of a processing cycle; other, particularly shorter, cycle times are also possible, however.

The maximum transmission delay time $t_s$ is the maximum time interval required in order to send request data 70, 80, 90 safely to all the computers on the processing level, even if the communication links between the processing computers and the switching level and/or the processing computers are not of the same type throughout, in particular have different speeds. The maximum transmission delay time $t_s$ advantageously contains a time reserve. Thus, even under the most unfavorable transmission conditions, data transmission from the switching level to the processing level takes no longer than the maximum transmission delay time $t_s$.

The request data 70 are provided with a time marking by the switching level and are transmitted to the processing level as request data 75. As can be seen from FIG. 3, the request data 75 arrive at the three computers on the processing level at different times. The time lines III, IV show that the request data 75 do not arrive in good time on two of the three processing computers at the start $t_0$ of the next processing step $C_0$; the time marking for the request data 75 does not come within a significant value range. For this reason, the computers on the processing level do not start processing the request data 75 until at the time $t_{70}$, which corresponds to the start of the next processing step $C_1$ but one. This ensures that the request data 75 are processed redundantly by a plurality of, in particular all of the, processing computers.

The request data 80 are sent to all the computers on the processing level in good time before the start of the processing step $C_2$, so that these computers actually start processing the time-marked request data 85 at the time $t_{80}$ of the start of the next processing step $C_2$ after the data 80 appear. In the latter case, the time marking for the request data 85 thus comes within a significant value range, which means that the processing by the processing computers actually takes place in the next processing step $C_2$, which follows the time at which the request data appear.

The request data 90 are likewise provided with a time marking by the switching level and are routed to the computers on the processing level, where they arrive on two of the processing computers in good time before the start of the next processing step. In the case of the third computer on the processing level, however, a fault occurs. As such, the request data 95 cannot be processed by this computer.

However, the time marking for the request data 95 comes within a significant value range, since these data have arrived on the operational computers on the processing level in good time before start of the next processing step. Thus, these operational computers adopt processing of the request data 95 at the time t90 of the start of the next processing step $C_3$. Despite the fault in one or more computers on the processing level, the request data 95 are processed by the operational computers on the processing level. The fault thus does not result in any loss of data or calculated results.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A fault-tolerant computer arrangement, comprising:
   a switching level including at least one switching computer providing incoming request data with a time marking; and
   a processing level including at least two processing computers that are supplied with the request data, in parallel, by the switching level, the at least two processing computers processing the request data beginning at a first time if a current value of the time marking provided with the request data falls within a range and processing the request data beginning at a subsequent time if the current value of the time marking included with the request data does not fall within the range, wherein
   the at least two processing computers start processing the request data synchronously.

2. The computer arrangement as claimed in claim 1, wherein the switching level accepts incoming request data from at least one external device and transmits a calculated result to the at least one external device.

3. The computer arrangement as claimed in claim 2, wherein the switching level assesses results calculated by the at least two processing computers from the request data based on a prescribed validity rule, selects one result from the results based on the assessment, and transmits the selected result to the at least one external device.

4. The computer arrangement as claimed in claim 3, wherein the switching level includes at least two switching computers, each of the at least two switching computers detecting a malfunction in at least one other switching computer and adopting a function of the at least one other switching computer based on a detection of the malfunction.

5. The computer arrangement as claimed in claim 3, wherein the computer level is divided into at least two processing sublevels, each of the at least two processing sublevels including at least two computers processing a respective particular request.

6. The computer arrangement as claimed in claim 5, wherein each of the at least two processing sublevels is associated with at least one request switching computer, request switching computer specializes in switching request data of a particular type and is one of the at least one switching computer.

7. The computer arrangement as claimed in claim 2, wherein the switching level includes at least two switching computers, each of the at least two switching computers detecting a malfunction in at least one other switching computer and adopting a function of the at least one other switching computer based on a detection of the malfunction.

8. The computer arrangement as claimed in claim 2, wherein the processing level is divided into at least two processing sublevels, each of the at least two processing sublevels including at least two computers processing a respective particular request.

9. The computer arrangement as claimed in claim 8, wherein each of the at least two processing sublevels is associated with at least one request switching computer, the request switching computer specializes in switching request data of a particular type and is one of the at least one switching computer.

10. The computer arrangement as claimed in claim 1, wherein the switching level includes at least two switching computers, each of the at least two switching computers detecting a malfunction in at least one other switching computer and adopting a function of the at least one other switching computer based on a detection of the malfunction.

11. The computer arrangement as claimed in claim 1, wherein the processing level is divided into at least two processing sublevels, each of the at least two processing sublevels including at least two computers processing a respective particular request.

12. The computer arrangement as claimed in claim 11, wherein each of the at least two processing sublevels is associated with at least one request switching computer, the request switching computer specializes in switching request data of a particular type and is one of the at least one switching computer.

13. A method for operating a fault-tolerant computer arrangement including a switching level and a processing level, the method comprising:
  a) receiving incoming request data using at least one switching computer on the switching level, and providing the data with a time marking;
  b) forwarding the request data provided with the time marking, in parallel using the at least one switching computer, to at least two processing computers on the processing level; and
  c) processing the request data using the at least two processing computers beginning at a first time if a current value of the time marking provided with the request data falls within a range, and processing the request data beginning at a subsequent time if the current value of the time marking included with the request data does not fall within the range, wherein
  the at least two processing computers start processing the request data synchronously.

14. The method as claimed in claim 13, further comprising:
  assessing results, calculated by the at least two processing computers in said step c) and associated with the request data, using the at least one switching computer based on a prescribed validity rule, and
  selecting one result from the results based on this assessment.

15. The method as claimed in claim 14, wherein the incoming request data are read in, in parallel, by at least two switching computers.

16. The method as claimed in claim 13, wherein the incoming request data are read in, in parallel, by at least two switching computers.

17. A method for operating a fault-tolerant computer arrangement including a switching level and a processing level, the method comprising:
  providing received request data with a time marking on the switching level;
  forwarding the request data with the time marking, in parallel, to at least two processing computers on the processing level; and
  processing the request data using the at least two processing computers beginning at a first time if a current value of the time marking provided with the request data falls within a range, and processing the request data using the at least two computers beginning at a subsequent time if the current value of the time marking provided with the request data does not fall within the range, wherein
  the at least two processing computers start processing the request data synchronously.

18. The method as claimed in claim 17, further comprising:
  assessing results associated with the request data on the switching level based on a validity rule, and
  selecting one result from the results based on this assessment.

19. The method as claimed in claim 18, wherein the received request data are read in, in parallel, by at least two switching computers on the switching level.

20. The method as claimed in claim 17, wherein the received request data are read in, in parallel, by at least two switching computers on the switching level.

21. A fault-tolerant computer arrangement, comprising:
  at least one switching computer providing incoming request data with a time marking; and
  at least two processing computers supplied with the request data, in parallel, by the at least one switching computer, the at least two processing computers processing the request data beginning at a first time if the current value of the time marking provided with the request data falls within a range, and processing the request data beginning at a subsequent time if the current value of the time marking provided with the request data does not fall within the range, wherein
  the processing computers start processing the request data synchronously.

22. The computer arrangement as claimed in claim 21, wherein an interface of the at least one switching computer accepts the incoming request data from at least one external device and transmits an associated calculated result to the at least one external device.

23. The computer arrangement as claimed in claim 22, wherein the at least one switching computer assesses results calculated by the at least two processing computers for the request data based on a prescribed validity rule, selects one result from the results based on this assessment, and transmits the selected result to the at least one external device.

24. The computer arrangement as claimed in claim 21, wherein at least two switching computers are included, and each of the at least two switching computers detects a malfunction in at least one other switching computer and adopts a function of the at least one other switching computer based on a detection of the malfunction.

25. The computer arrangement as claimed in claim 21, wherein a processing level, including the at least two processing computers, is divided into at least two processing sublevels, each of the at least two processing sublevels including at least two computers processing a respective particular request.

26. A fault-tolerant computer arrangement, comprising:
  first means for providing received request data with a time marking on a switching level of the arrangement and for forwarding the request data with the time marking, in parallel, to a processing level of the arrangement; and at least two processing means on the processing level, each of the two processing means for processing the request data beginning at a first time if the current value of the time marking provided with the request data falls within a range, and for processing the request data beginning at a subsequent time if the current value of the time marking provided with the request data does not fall within the range, wherein the at least two processing means to start processing the request data synchronously.

27. The arrangement as claimed in claim 26, wherein the first means assesses results, calculated by the at least two processing means and associated with the request data based on a prescribed validity rule, and selects one result from the results based on this assessment.

28. The arrangement as claimed in claim 26, wherein the received request data are read in, in parallel, by at least two switching computers of the first means.

29. The arrangement as claimed in claim 27, wherein incoming request data are read in, in parallel, by at least two switching computers of the first means.

30. A fault-tolerant computer arrangement, comprising:
at least one switching means for allocating incoming request data with a time marking; and
at least two processing means, supplied in parallel with the request data by the at least one switching means, each for processing the request data beginning at a first time if the current value of the time marking provided with the request data falls within a range and for processing the request data beginning at a subsequent time if the current value of the time marking provided with the request data does not fall within the range, wherein
the processing means are adapted to start process the request data synchronously.

* * * * *